Figure 1:
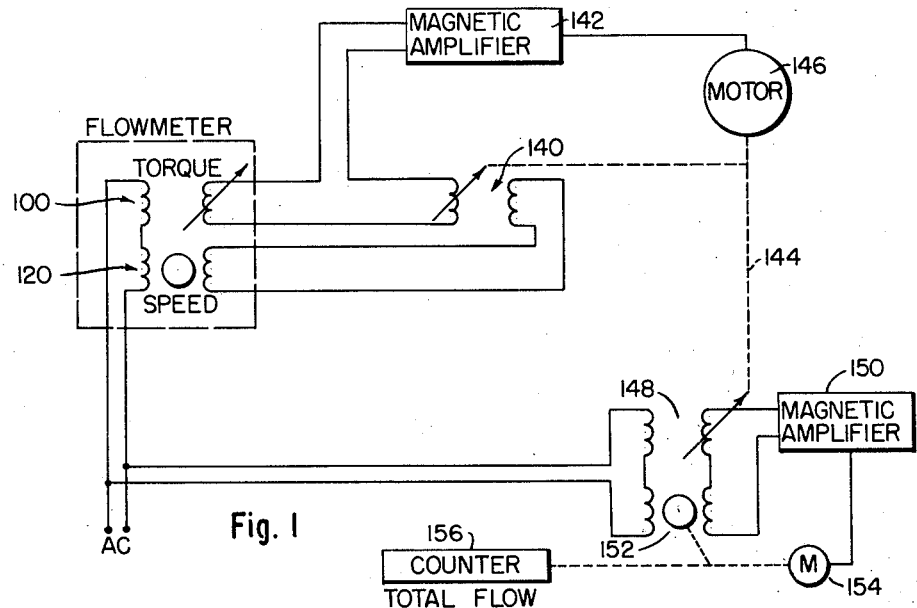

Jan. 7, 1958     R. B. WHITE     2,819,437
ELECTRICAL MEASURING CIRCUITS FOR MASS FLOWMETERS
Filed Nov. 1, 1954     2 Sheets-Sheet 1

*INVENTOR.*
ROBY B. WHITE
BY
Kenway, Jenney, Witter & Hildreth
ATTORNEYS

INVENTOR.
ROBY B. WHITE
BY
Kenway, Jenney, Witter & Hildreth
ATTORNEYS

United States Patent Office

2,819,437
Patented Jan. 7, 1958

2,819,437

ELECTRICAL MEASURING CIRCUITS FOR MASS FLOWMETERS

Roby B. White, Sharon, Mass., assignor, by mesne assignments, to American Radiator & Standard Sanitary Corporation, New York, N. Y., a corporation of Delaware Application November 1, 1954, Serial No. 465,783

11 Claims. (Cl. 318—28)

This invention relates to electrical measuring circuits and more particularly to circuits adapted for use with mass flowmeters to render mass flow rate and total flow measurements.

In recent years a great deal of time and effort has been expended in the development of mass flowmeters employing gyroscopic and Coriolis force principles. A gyroscopic mass flowmeter may be defined as one in which a gyroscopic couple is set up by causing the fluid undergoing measurement to flow through a coil which may be circular. Simultaneously, the coil is rotated or oscillated about an axis perpendicular to the coil axis. The gyroscopic couple produced about a third axis perpendicular to the axis of the coil and of rotation has a magnitude which is a function of the mass of the fluid flowing in the coil. In a Coriolis mass flowmeter, the fluid whose mass flow is to be measured is accelerated tangentially through a housing which contains a sensing element. A torque is developed by the sensing element in reaction to the Coriolis force of the fluid being accelerated past the sensing element. This torque is a function of the mass rate of flow of the fluid. The extent to which flowmeter development has progressed may best be illustrated by an inspection of copending applications Ser. Nos. 442,351 and 454,485, filed July 9, 1954, and September 7, 1954, respectively.

Flowmeters employing gyroscopic principles are governed by the operative formula $T=2\pi R^2 rW$, where R is the effective radius of the spinning mass, $r$ is the precessional velocity of the mass in radians/sec., W is the mass flow rate of the flowing fluid in slugs/sec., and T is the gyroscopic couple produced about an axis perpendicular to the spin and precision axes. Meters employing Coriolis force to obtain mass flow measurements are governed by the formula $M=W\omega(R_2^2-R_1^2)$, where M is the net moment about the axis of rotation due to Coriolis force, W is the mass flow rate of the fluid passing through the meter, $\omega$ is the angular velocity of the sensing element, and $R_1$ and $R_2$ are the radii at the inlet and outlet of the accelerating tube or impeller respectively.

Heretofore, the research and development in the flowmeter art has been principally directed to the stabilization of various factors in the above equations and the prevention of the introduction of extraneous forces to permit the measurement of the true gyroscopic couple or net moment. Having been highly successful in that field of development, researchers have found it necessary to provide accurate, relatively inexpensive means for translating into intelligence the forces measured at the meters.

The high degree of accuracy sought in the research programs may best be demonstrated by the fact that the industry has refused to depend upon the constant speed of a synchronous motor to drive the sensing elements in the meters. Therefore, instead of measuring T or M alone to determine the value of W, it has become necessary to measure $\omega$ or $r$ as well, which obviously requires further mathematical manipulations to obtain mass flow measurements. Various instruments have been devised to accurately measure T, M, $r$, and $\omega$. The circuits described in the following detailed description and illustrated in the accompanying drawing translate the measurements of T and $r$ or M and $\omega$ into mass flow rate or total flow readings.

The primary object of this invention, therefore, is to provide highly dependable means capable of accurately performing the necessary mathematical functions to obtain mass flow measurements.

Another object of this invention is to provide means capable of rendering total flow measurements of the fluid passing through the flowmeter.

In the accomplishment of these and other objects I provide as one important feature of this invention an electrical circuit capable of producing a motor shaft displacement proportional to W.

Another feature of this invention is the provision of an electrical circuit capable of producing a motor shaft rotational speed proportional to the displacement of a second motor shaft.

Still another feature of this invention is the provision of electrical circuits for controlling the displacement of a ball and the rotation of a disc in a ball disc mechanism to render a drum rotation proportional to W.

These and other objects and features will be more readily understood and appreciated from the following detailed description of four embodiments of this invention selected for purposes of illustration and shown in the accompanying drawing in which:

Figs. 1–4 are diagrams partially diagrammatic and partially schematic of four different embodiments of this invention.

Referring first to the embodiment of this invention illustrated in Fig. 1, a dynamo transformer 100 and a drag cup generator 120 are observed to be contained within a broken lined box which diagrammatically represents the mass flowmeter. Both the transformer and generator may be of the type disclosed in my above-named copending application Ser. No. 442,351. The transformer is illustrated and described in great detail in the patent to Mueller, Ser. No. 2,488,734 issued Nov. 22, 1949.

As has been suggested in the introductory paragraphs of this specification and illustrated and described in my above-named copending application, the dynamo transformer is assembled on the flowmeter and renders an output voltage proportional to the product of the mass flow rate W of the fluid flowing through the meter and the angular velocity $\omega$ of the sensing element. The rate generator 120 is similarly arranged on the meter to render a signal proportional to the angular velocity $\omega$ of the sensing element.

The output signal of the generator 120 is connected to the primary of a second dynamo transformer 140 having characteristics identical to the transformer 100. The secondary of transformer 140 is connected in circuit with the secondary of transformer 100 in series opposed relationship and the differential of the two signals is amplified by the magnetic amplifier 142 and energizes a motor 146 having a shaft 144 which turns in response to energization of the motor.

It will be observed that the shaft 144 (represented by broken lines 144), of the motor 146 is directly coupled to the transformer 140, the mechanical connection also being represented diagrammatically by a broken line. A movable element or armature in the transformer 140 is directly controlled by the connection. The magnitude of the output signal of the transformer 140 is controlled by the voltage impressed across its primary and a second factor determined by the amount of displacement of the movable element therein from a normal or neutral position.

The operation of the circuit thus far described will now be presented to aid in the understanding of its function. Assume first that the circuit is disconnected from its source of A. C. power. Under this condition, both the transformer 100 and generator 120 will fail to render an output signal, and the motor 146 will be deenergized and its shaft 144 will remain in a neutral position, thereby maintaining the movable element of the transformer 140 in its normal position.

If upon energization of the transformer 100 and the generator 120 the sensing element of the flowmeter is moving angularly and fluid is flowing through said element, a voltage proportional to Wω will be present across the secondary of dynamo transformer 100 and a voltage proportional to ω will be present across the secondary coil of the rate generator 120. At that instant, although the primary of the transformer 140 is energized, no signal will be produced across its secondary for the movable element will still be in its neutral position, introducing a zero factor into the equation for the transformer output.

Therefore, the signal fed to hte amplifier 142 will be proportional to Wω and the motor shaft 144 will begin to turn. It can be assumed that motor 146 is so connected to the amplifier that its shaft rotational displacement will be in a direction toward an angle of displacement W, for simple experimentation with the circuit by a man skilled in the art may readily determine the proper connections. Continuing with the description of the circuit's operation, as the shaft 144 turns, displacing the movable element of transformer 140 from its neutral position, a voltage will be produced across the transformer secondary. Because the secondaries of the two transformers thus far described are series opposed, a reduced voltage will be impressed across the motor terminals. Obviously, as the shaft 144 continues to turn toward a value W, the secondary voltage across the transformer 140 will approach the value of the voltage across the transformer 100. When W rotational displacement is reached, the difference of output voltages will reduce to zero, and further rotational displacement of the shaft 144 will not take place. It now becomes apparent that the rotational displacement of the shaft 144 is proportional to the mass flow rate W of the fluid passing through the sensing element.

Proceeding now to a description of the remaining portions of the circuit illustrated in Fig. 1, a third dynamo transformer 148 is observed to be connected directly to the A. C. power source. The transformer 148 is of the same character as transformers 100 and 140 and has a movable armature whose position is controlled by the motor shaft 144. The voltage across the secondary of the transformer 148 is determined by the input impressed across its primary winding and a second factor which is a direct function of the armature displacement.

Another rate generator 152 similar to the generator 120 has its secondary connected in series opposition to the secondary of the transformer 148 and the net voltage from the two coils is amplified by a magnetic amplifier 150. The amplified signal serves to energize a motor 154 of the class wherein its shaft rotates at a speed proportional to the voltage impressed across its input terminals.

The operation of that part of the circuit will now be described. As has already been suggested, the output signal of the transformer 148 is controlled by the rotational displacement of the shaft 144. Because the transformer is energized directly from the A. C. power source and, therefore, may be considered to have a constant input, the voltage across the secondary will be proportional to W.

If the circuit's operation is analyzed at the instant it is energized, it will be observed that the voltage impressed across the motor 154 is equal to the voltage across the secondary of transformer 148, for no voltage is initially generated by the rate generator 152. This is so because at the instant operation is commenced, the shaft of motor 154 is not rotating, and therefore, the armature of generator 152 controlled by said shaft is stationary. After starting, however, motor 154 will begin to rotate, and the generator 152 will produce a voltage which will reduce the total voltage fed to the amplifier. The motor 154 must continue to rotate so long as there is an output voltage from the transformer 148. For if the motor begins to slow down when the net voltage fed thereto approaches zero, the net voltage will then begin to increase as a result of a decrease in the voltage across the secondary coils of the generator 152. It will be understood that the presence of the generator 152 in the circuit constitutes a sort of feed-back to avoid dependence upon the linearity of the amplifier etc. What has been accomplished, then, is a shaft rotation in revolutions per minute proportional to the mass flow rate W, or more directly, a shaft rotation of motor 154 proportional to the shaft displacement 144. Because the revolutions per minute of the armature or cup of generator 152 dictates the voltage produced across the generator's secondary, that is, its output voltage is directly proportional to its revolutions per minute, a time factor is introduced into the circuit. It will be appreciated that merely by placing a counter 156 on the shaft of the motor 154 the rate of flow measurement will be integrated with respect to time and total flow in pounds may be directly read at the counter. Although this may be accomplished without the aid of the generator 152, accuracy is greatly enhanced by its inclusion in the system.

The operation may be summarized as follows: The output voltage of dynamo transformer 100 is proportional to the torque to which it responds, that is, proportional to Wω. The output voltage of rate generator 120 is supplied as an input to dynamo transformer 140. Hence, the output voltage of dynamo transformer 140 is proportional to its own shaft displacement times the speed of rate generator 120.

The output voltage of dynamo transformer 100 is amplified in magnetic amplifier 142 and then drives a motor 146. The motor 146 is mechanically connected to the shaft of dynamo transformer 140 and rotates that shaft in the proper direction to make the output voltage of dynamo transformer 140 equal to that of dynamo transformer 100, at which point rotation will cease. The rotational displacement of shaft 144, at that point, is proportional to the mass flow W.

Figure 2:
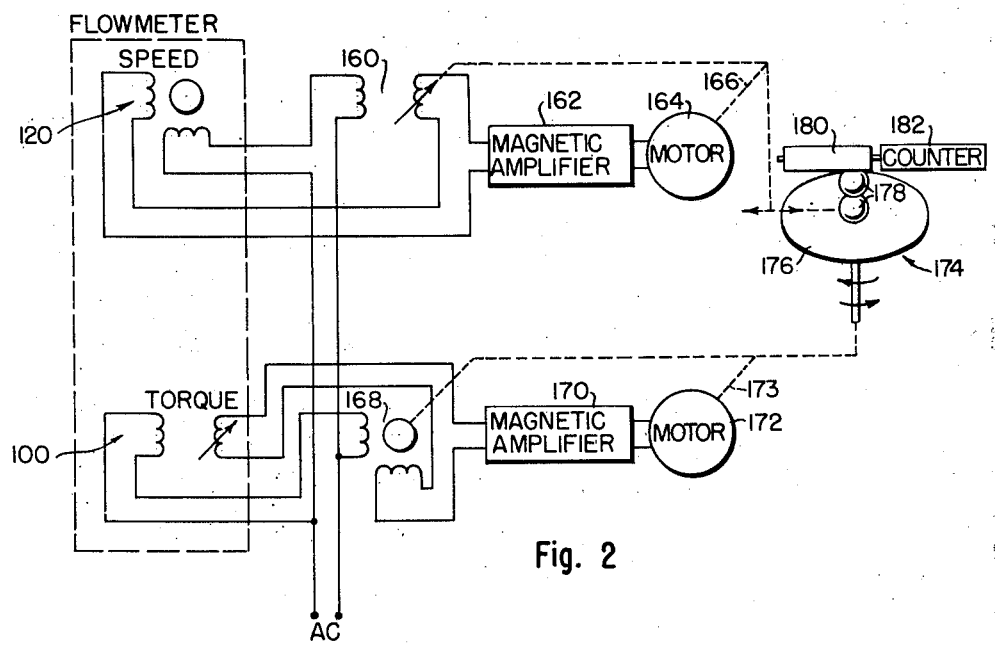

The circuit illustrated in Fig. 2 performs the same function as the circuit heretofore described. Once again, a flowmeter represented by the box formed by broken lines and bearing the appropriate legend carries a drag cup generator 120 and a dynamo transformer 100 identical to those similarly numbered in the preceding figure. The output voltage of generator 120 is proportional to the speed of rotation ω of the sensing element and the voltage out of transformer 100 is directly proportional to the product of mass flow rate W speed of rotation ω. The portion of the circuit containing the generator 129 and a motor 164 is similar to the portion of the circuit in Fig. 1 containing motor 146 and transformers 100 and 140, while the circuit of transformer 100 and motor 172 is similar to that of the transformer 148 and motor 154.

Referring first to the circuit of generator 120, it will be seen by an inspection of the drawing that the generator 120 and a transformer 160 are energized from a common A. C. power source and have their secondaries connected in series opposed relationship. A magnetic amplifier connected to the members 120 and 160 amplifies the net signal it receives and feeds it to a motor 164 of the type wherein its shaft rotates an amount which is proportional to the magnitude of the signal fed thereto. The rotational displacement of the shaft 166 of motor 164 controls the position of the armature of dynamo transformer 160, this mechanical connection being represented diagrammatically by a broken line.

A description of the operation of this circuit will now be presented. First, assume that the circuit to the A. C. power source is open. The motor 164 will obviously be deenergized and its shaft 166 will be in its neutral or non-displaced position. As a result, the armature of the transformer 160 will also be in its neutral position, and therefore no output voltage will be rendered by it immediately upon energization of its primary.

Now assume that generator 120 is energized, fluid is flowing through the meter, and the sensing element is rotating at an angular velocity ω. At the instant energization occurs, the voltage across the secondary coil of the generator 120 will be proportional to ω, while the voltage out of the transformer 160 will be zero. The motor shaft 166 will start to turn, resulting in a gradually increasing voltage out of the transformer. When the rotational displacement of shaft 166 is proportional to ω, the voltage from the transformer 160 will equal that of the generator 120, and further rotation of the shaft will be prevented due to the zero net voltage fed to the amplifier. It is seen that a shaft rotational displacement proportional to ω is achieved.

The circuit containing the transformer 100, a rate generator 168 and the motor 172 will now be described. As stated above, the transformer 100 is mounted on the flowmeter and renders an output signal proportional to the product of W and ω. If the transformer 100 is energized as the sensing element of the flowmeter rotates and fluid is flowing through the meter, the voltage across the secondary of the transformer will be proportional to Wω. Motor 172 will instantaneously become energized and its shaft rotational velocity will be proportional to Wω. The shaft 173 of the motor 172 is mechanically coupled to the rate generator 168 whose secondary is connected in series opposition with the secondary of dynamo transformer 100. As the shaft 173 rotates the voltage across the secondary of the generator 168 will increase which will reduce the net signal fed to the magnetic amplifier 120. As the net voltage impressed across the amplifier reduces, the rotational velocity of the shaft 173 will decrease, resulting in a decrease in the output of the generator 168. Thus it will be understood that the presence of the generator 168 constitutes a sort of feed back to avoid dependence upon the linearity of the amplifier and motor. It is seen that the speed of rotation of the shaft 173 is proportional to the product of W and ω.

A ball disc mechanism generally designated by the numeral 174 is employed to perform the necessary mathematical functions to obtain mass flow rate and total flow measurements. As is apparent from an inspection of the drawing, the angular velocity of the disc 176 is proportional to Wω while the displacement of the balls is proportional to ω. Simple mathematics indicates that the revolutions per minute of the shaft or drum 180 will be proportional to W. The ball disc mechanism performs a dividing function in the assembly to render mass flow rate measurements. Obviously a counter 182 mounted on the drum will record the total flow.

Figure 3:
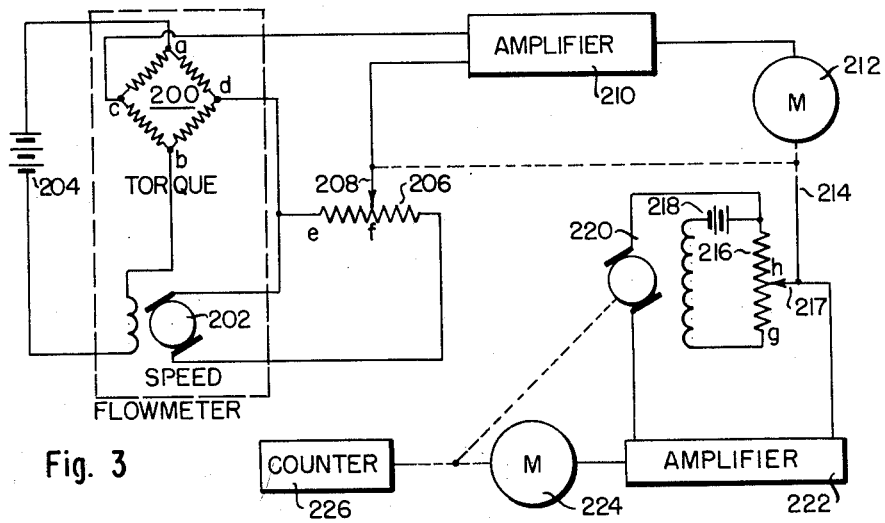
Figure 4:
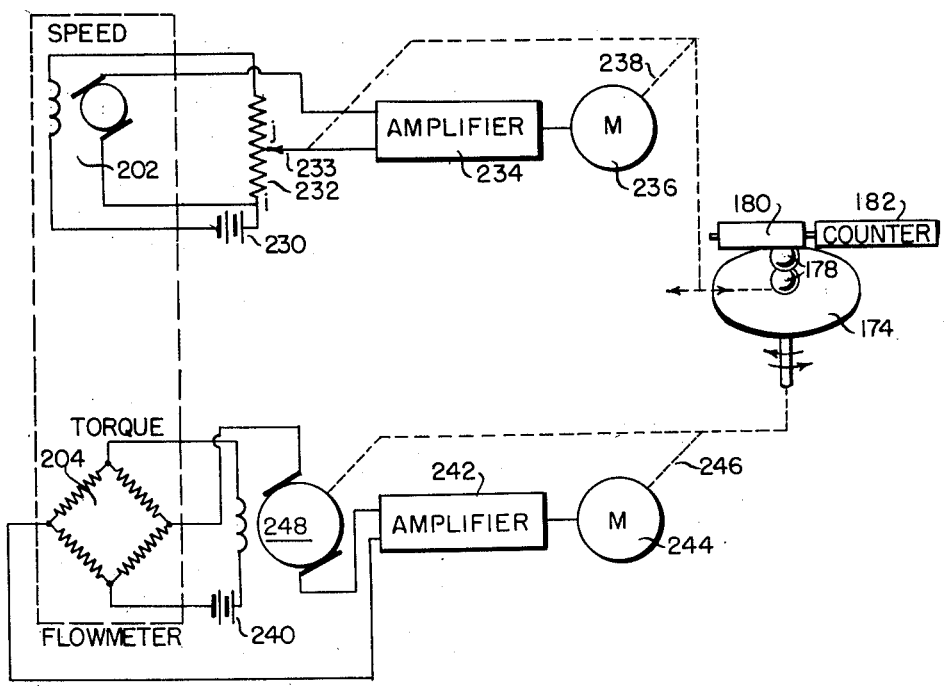

The embodiments of this invention illustrated in Figs. 3 and 4 are the direct current equivalents of the circuits shown in Figs. 1 and 2. Referring first to the embodiment of this invention illustrated in Fig. 3, a strain gauge bridge circuit 200 and a D. C. generator 202 are seen to have been substituted for the dynamo transformer and the drag cup generator, respectively of the preceding embodiments. The strain gauge bridge circuit is of the well known type and is illustrated as being energized from a D. C. battery 204 connected across opposite corners $a$ and $b$ of the bridge. The other corners of the bridge $c$ and $d$ are observed to be connected across an amplifier 210 and a portion of a potentiometer 206 by means of the slide tap 208. The amplifier 210 is connected to supply a potential to a D. C. motor 212 of the character wherein its shaft is rotationally displaced proportional to the magnitude of the signal fed thereto.

The D. C. generator 202 is electrically connected to the ends of the potentiometer 206 and is of the type which generates a signal proportional to the angular velocity of its armature. The generator 202 has its armature connected to the sensing member of the flowmeter and its output voltage is proportional to ω. It will be noted that the position of the slide tap 208 of the potentiometer is controlled by the displacement of the motor shaft 214.

The moment the bridge circuit is energized, assuming fluid flow through the meter and rotation of the sensing means, a potential proportional to the product of W and ω will be present across the bridge connections $c$ and $d$. The bridge per se forms no part of this invention and, therefore, it is deemed unnecessary to describe its conventional operation in great detail.

Energization of the circuit will cause the motor 212 to receive an amplified signal from the amplifier 210 and the shaft 214 will begin to turn, moving the slide tap 208 of the potentiometer. As the voltage across the portion of the resistance $e$—$f$ of the potentiometer in the amplifier circuit increases, the voltage supplied to the motor will decrease, and the speed of rotation will begin to decrease. When the voltage across $e$—$f$ equals the output voltage across the terminals $cd$ of the bridge, obviously further shaft rotation will not occur. By adjusting the mechanical coupling between the motor shaft 214 and the slide tap 208, it will be seen that voltage across resistance $e$—$f$ may be made to reach the value Wω when the shaft rotational displacement is equal to W. The circuit described is thus observed to be the direct current equivalent of the circuit illustrated in Fig. 1, that is, a circuit capable of performing a division of Wω by ω.

The integrating portion of the circuit will now be described. A second potentiometer 216 having a slide tap 217 is observed to be controlled by the rotational displacement of the motor shaft 214. An amplifier 222 connected to a motor 224 of the type wherein its shaft rotates at a speed proportional to its impressed signal, is energized from a D. C. source 218. A direct current generator 220 similar to the generator 202 is also connected in the circuit energizing the amplifier. Its output voltage is controlled by the speed of rotation of the shaft of the motor 224.

It will be appreciated that upon initial energization of this circuit, a voltage drop across the resistance $g$—$h$ of the potentiometer 216 will be proportional to the rotational displacement W of the shaft 214, and therefore, the signal fed to the motor 224 from the power source will be proportional to W. The presence of the generator 220 eliminates the otherwise total dependency of accuracy upon the linearity of the amplifier 222 and furthermore introduces a time factor into the signal fed to the amplifier in a manner similar to the rate generator 152 in the circuit of Fig. 1. Therefore, a shaft velocity is obtained which is proportional to W, the mass flow rate of the fluid passing through the meter. The counter 226 connected to the shaft of the motor 224 facilitates the measuring of total flow.

The embodiment of this invention illustrated in Fig. 4 will now be described. A direct current generator 202 and a bridge circuit 204 are observed to be included in the mass flow meter structure and are the same in all respects as the like-numbered elements in Fig. 3. The generator 202 is energized directly from a D. C. power source 230 and generates a potential proportional to the speed of rotation of the sensing element ω. A potentiometer 232 has one end of its resistance connected to the output terminal of the generator and the potentiometer slide wire 233 is connected to an amplifier 234. The amplifier circuit is completed by a direct connection to the other output terminal of the generator.

Upon energization of the generator (assuming fluid flow through the meter and angular movement of the sensing element), the shaft 238 of the motor 236 will begin to rotate, and the mechanical coupling of the shaft to the slide tap of the potentiometer illustrated by the broken line will begin to change the resistance $i$—$j$ in the amplifier circuit. When movement of the slide tap effects a voltage drop across $i$—$j$ equal to $\omega$, obviously the amplifier will receive no further signal from the generator, and the shaft 238 will turn no further. Because of the direct coupling of the shaft to the slide wire, it will be apparent to a man skilled in the art that the rotational displacement of the shaft will be proportional to $\omega$.

The circuit containing the bridge type strain gauge will now be described in detail. The bridge 204 is observed to be energized directly from a D. C. power source and renders a voltage proportional to the product of $\omega$ and W. An amplifier 242 connected across the bridge is directly supplied a potential from the bridge and amplifies a signal to be fed to a motor 244. The motor 244 is of the type which produce a shaft rotation proportional to the signal fed thereto. A sort of feed back is introduced into the system by the inclusion in the amplifier circuit of a generator 248 energized by the D. C. power source 240. The generator 248 contains an armature (not shown) whose position is controlled by a direct coupling to the motor shaft 246.

Energization of the circuit will cause rotation of the shaft 246 at a speed proportional to the signal fed thereto, namely, W$\omega$. As the speed of the shaft increased, a reduced signal will be fed to the amplifier by virtue of the presence of generator 248, in a manner identical to that of the motor and generator 172 and 168 respectively of Fig. 2. Suffice it to state that the rate of shaft rotation remains proportional to W$\omega$ and the feed back or correction circuit reduces in importance the linearity of the amplifier in obtaining accurate measurements.

The shafts 238 and 246 are each coupled respectively to the balls and disc of the ball disc mechanism 174 identical to the like numbered element in Fig. 2. A division is performed by the mechanism which renders a speed of rotation of the drum 180 proportional to the mass flow rate W of the measured fluid. The counter 182 is secured to the drum to facilitate total flow readings.

Having described four embodiments of this invention, I believe that numerous modifications and substitutions will readily occur to a man skilled in the art to which this invention pertains. Therefore, it is not my intention that the scope of this invention be limited solely to the illustrated and described embodiments, but only by appended claims.

What I claim as new and desire to secure by Letters Patent of the United States is:

1. Apparatus for use with a mass flowmeter rendering a torque which is proportional to the product of the mass flow rate of the fluid passing therethrough and the angular velocity of its sensing element comprising means for rendering an output signal directly proportional to said torque, means for rendering an output signal directly proportional to said angular velocity, circuit means in which said signals are variably combined to produce a null condition and means including a motor driven shaft connected to said last named means for producing a shaft speed of rotation proportional to the quotient of said signals.

2. Apparatus for use with a mass flowmeter having an element which senses a torque proportional to the product of the mass flow rate of fluid passing therethrough and the angular velocity of said sensing element comprising electrical means for producing a signal proportional to the product of said mass flow rate and angular velocity, second electrical means for producing a signal proportional to the said angular velocity, circuit means in which said signals are variably combined to produce a null condition and means including a motor driven shaft responsive to said circuit means for producing a shaft speed of rotation proportional to the quotient of said signals.

3. Apparatus for use with a mass flowmeter having an element which senses a torque proportional to the product of the mass flow rate of fluid passing therethrough and the angular velocity of said sensing element comprising first electrical means for producing a first signal proportional to the product of said mass flow rate and angular velocity, second electrical means for producing a second signal proportional to said angular velocity, a motor having a displaceable shaft, means responsive to each of said signals connected to said motor for producing a displacement of said displaceable shaft proportional to the quotient of said first and second signals, a second motor having a rotatable shaft, and a circuit mechanically controlled by said displacement of said displaceable shaft connected to said second motor for producing a shaft speed of rotation proportional to said shaft displacement.

4. Apparatus for use with a mass flowmeter having an element which senses a torque proportional to the product of the mass flow rate of fluid passing therethrough and the angular velocity of said sensing element comprising a first electrical means for producing a signal proportional to the product of the mass flow rate and said angular velocity, a motor directly energized by said signal and having a shaft rotating at a rate proportional to said signal, second electrical means for producing a second signal proportional to the said angular velocity, a motor directly energized by said second signal and having a shaft displaced at an angle proportional to said second signal, and a ball disc mechanism operated by the shaft rotation and the shaft displacement for producing a shaft rotation proportional to the quotient of said signals.

5. Apparatus for use with a mass flowmeter having an element which senses a torque proportional to the product of the mass flow rate of fluid passing therethrough and the angular velocity of said sensing element comprising first electrical means for producing a signal proportional to the product of said angular velocity and said mass flow rate, second electrical means for producing a signal proportional to said angular velocity, a shaft, third electrical means connected to said first and said second electrical means responsive to said signals for rotating said shaft at a rate proportional to the quotient of said signals, and a counter connected to said shaft for measuring the total revolutions of said shaft.

6. Apparatus for use with a mass flowmeter having an element which senses a torque proportional to the product of the mass flow rate of fluid passing therethrough and the angular velocity of said sensing element comprising a pair of dynamo transformers having their secondary windings connected in series opposition, one of said transformers producing across its secondary a signal proportional to the product of said mass flow rate and angular velocity, a rate generator for producing a signal proportional to said angular velocity and connected to energize the other of said transformers, a motor having a displaceable shaft energized by the net voltage produced across the secondaries of each of said transformers, said shaft being mechanically coupled to said other of said transformers for effecting a voltage across its secondary which is a function of said shaft's displacement, a second motor having a rotatable shaft, and electrical means mechanically controlled by the displacement of said first named shaft for rotating said second named shaft at a rate proportional to the first shaft's displacement.

7. Apparatus as defined in claim 6 further characterized by a counter connected to said rotating shaft to record its total revolutions.

8. Apparatus for use with a mass flowmeter having an element which senses a torque proportional to the product of the mass flow rate of fluid passing therethrough and the angular velocity of said sensing element comprising a first electrical means for producing an electrical signal proportional to said torque, a motor having a displaceable shaft, an electrical circuit including a potentiometer connecting said motor to said first electrical means, said potentiometer being mechanically connected to said shaft for effecting a voltage drop across said potentiometer proportional to the displacement of said shaft, a second electrical means connected across said potentiometer producing a signal proportional to said angular velocity, a second motor having a rotatable shaft, and electrical means mechanically controlled by said displaceable shaft connected to said second motor producing a rate of rotation of said second named shaft proportional to the displacement of said first named shaft.

9. Apparatus as defined in claim 8 further characterized by a counter connected to said rotatable shaft for determining the total revolutions of said shaft.

10. Apparatus for use with a mass flowmeter having a sensing element which senses a torque proportional to the product of the mass flow rate of fluid passing therethrough and the angular velocity of said sensing element comprising first means connected to said flowmeter for providing a first voltage proportional to the product of the mass flow rate of said fluid through said flowmeter and said angular velocity of said sensing element, second means connected to said flowmeter for providing a second voltage proportional to said angular velocity of said sensing element, a voltage source electrically connected to said first and to said second means, means for converting an electrical signal into a mechanical displacement of a body, said last-named means being electrically connected to said first means and responsive to said first voltage, means for converting a mechanical displacement into an electrical signal, said last-named means being mechanically connected to and driven by said body and electrically connected to provide a voltage opposing said first voltage to said means for converting an electrical signal into a mechanical movement, third means for providing a third voltage varying with the position of said body, said third means being electrically connected to and energized from said voltage source and mechanically connected to said body, fourth means for generating a fourth voltage varying with the position of said body, said third and said fourth voltages being connected in opposition, and an indicating device electrically connected to said third and fourth means for providing mechanical motion varying as the sum of said third and fourth voltages.

11. An electrical circuit for measuring total flow in a flowmeter having a sensing element comprising means connected to said flowmeter for providing a first signal proportional to the product of the torque and the angular velocity of said sensing element, means connected to said flowmeter for providing a second signal proportional to the angular velocity of said sensing element, means for combining said first and said second signals to produce a null condition, and means connected to said last-named means for producing movement of an indicating member which is a function of the output of said last-named means.

No references cited.